United States Patent Office 2,971,842
Patented Feb. 14, 1961

2,971,842

LIGHT SENSITIVE LAYERS FOR PHOTOMECHANICAL REPRODUCTION

Ralph G. D. Moore, Chenango Forks, and Peter T. Woitach, Jr., Binghamton, N.Y., assignors to General Aniline & Film Corporation, New York, N.Y., a corporation of Delaware No Drawing. Filed Mar. 21, 1956, Ser. No. 572,835

18 Claims. (Cl. 96—33)

The present invention pertains to light sensitive layers for photomechanical reproduction, and particularly to the use in the preparation of such light sensitive layers of photosensitive diazo derivatives of heterocyclic nitrogenous bases.

The use in the lithographic art of diazo compounds for the preparation of light sensitive layers for photomechanical reproduction is well known. In their earliest application these compounds were employed in conjunction with hydrophilic colloids, such as gelatin and the like, with the idea of utilizing their ability to harden the colloids under exposure to light to thereby render the colloid ink-receptive in the hardened areas. More recently, it has been found possible to dispense with the colloid and employ the photodecomposition product of the diazo itself to form an ink-receptive image, for example, on metal surfaces. The diazo compounds heretofore found useful in such application are generally characterized by the fact that while the photodecomposition product is highly water resistant and, hence, ink- or grease-receptive, the diazos per se are usually readily soluble and removable by treatment with water.

It has been possible to prepare printing plates in this manner which function satisfactorily to some extent. However, the performance of such plates is far from optimum due to poor stability, especially in the absence of a colloid, of the diazo coated but unprocessed plates. Consequently, considerable research has been directed toward the finding of diazos which would permit the formation of printing plates having a long working life and free from the objections inherent in those utilizing the water soluble diazos.

We have now found that it is possible to prepare light sensitive layers which yield excellent printing images by the use of water insoluble diazo compounds which are heterocyclic nitrogenous bases in which a carbon atom in the hetero ring bears the grouping $=N_2$. These diazos have great affinity for printing inks and though water insoluble may be applied to the surfaces of the plate from a variety of organic solvents. Of equal importance is the fact that the light decomposition products of said diazos exhibit a marked difference in solubility from the diazos per se, and hence an image may be developed after exposure without damage to the ink-receptive areas.

Said diazos, their use in the formation of light sensitive layers for photomechanical reproduction, and the processing of said layers constitute the purposes and objects of our invention.

It has been said that the gist of our invention involves the employment, as light sensitive diazos for printing plates, of nitrogenous heterocyclic bases containing in the hetero ring the grouping $>C=N_2$. These compounds may be typified by the general formula:

$$Z \diagdown C=N_2 \diagup Y$$
$$N$$

wherein Z and Y represent the atoms necessary to complete a 5-membered heterocyclic ring system in which the only hetero atoms are nitrogen atoms, there being no more than 3 such hetero atoms in the ring. While any compounds embraced by this formula are suitable for our purpose, we prefer to employ those compounds of the following formulae:

(I)
$$R_1—X——C=N_2$$
$$R_2—X \diagdown V—R_3$$
$$N$$

and (II)
$$A \diagdown CH——C=N_2$$
$$\diagdown CH \diagup V—R_3$$
$$N$$

in which $R_1X$, $R_2W$ and $R_3V$ may be $$—N= \quad —C—H \quad —C—alkyl$$
$$\qquad \quad \parallel \qquad \quad \parallel$$

i.e., $$—C—methyl \quad —C—ethyl \quad —C—propyl$$
$$\parallel \qquad\qquad \parallel \qquad\qquad \parallel$$

and the like, $$—C—aromatic$$
$$\parallel$$

in which the aromatic radical is phenyl; naphthyl; halogenphenyl, i.e., bromophenyl, chlorophenyl; alkylene dioxyphenyl, i.e., methylene dioxyphenyl; biphenylyl; phenylsulfonamidophenyl; N-methylphenylsulfonamidophenyl; acylaminophenyl, i.e., acetomidophenyl; alkylsulfonylphenyl, i.e., methylsulfonylphenyl; arylsulfinylphenyl, i.e., phenylsulfinylphenyl; alkenylphenyl, i.e., vinylphenyl, and A represents the atoms necessary to complete a benzo ring system, it being understood that the hetero ring shall contain no more than 3 nitrogen atoms.

The compounds embraced by Formula I may be more specifically defined by the following formulae:

(A)
$$R_4—C——C=N_2$$
$$R_5—C \diagdown C—R_6$$
$$N$$
3-diazo-3H-pyrrolenines (B)
$$R_4—C——C=N_2$$
$$R_5—C \diagdown N$$
$$N$$
3-diazo-3H-isopyrazoles (C)
$$N——C=N_2$$
$$R_5—C \diagdown C—R_6$$
$$N$$
4-diazo-4H-isoimidazoles (D)
$$R_4—C——C=N_2$$
$$N \diagdown C—R_6$$
$$N$$
4-diazo-4H-isopyrazoles (E)
$$R_4—C——C=N_2$$
$$N \diagdown N$$
$$N$$
4-diazo-4H-1,2,3-triazoles in which $R_4$, $R_5$ and $R_6$ are alkyl, such as methyl, ethyl, propyl, and the like; an aromatic radical such as phenyl, naphthyl, halogenphenyl, i.e., bromophenyl, chlorophenyl; alkylene dioxyphenyl, i.e., methylenedioxyphenyl; biphenylyl; phenylsulfonamidophenyl; N-methyl-phenylsulfonamidophenyl; acylaminophenyl, i.e., acetamidophenyl; alkylsulfonylphenyl, i.e., methylsulfonylphenyl; arylsulfinylphenyl, i.e., phenylsulfinylphenyl; alkenylphenyl, i.e., vinylphenyl and the like.

Compounds covered by Formula II above, which are particularly suitable for use, are the pseudoindoles and diazoindiazoles which may be represented by the following formulae:

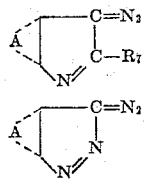

in which A represents the atoms necessary to complete a benzo ring system and $R_7$ is alkyl, such as methyl, ethyl, propyl, butyl, amyl, octyl, stearyl and the like, or a radical of aromatic character, such as phenyl, tolyl, naphthyl, indolyl and the like. It has been found especially advantageous to employ compounds in which the benzo ring, fused to the heterocyclic ring, is substituted by a group such as benzo, aryl, such as phenyl, tolyl, naphthyl and the like, acyl, such as acetyl, propionyl, butyryl, benzoyl and the like, halogen, such as chlorine, bromine, iodine and the like, nitro, or similar groups which are negative in character. These substituent groups should preferably appear in positions capable of resonating with the nitrogen atom and diazo group in the 1- and 3-positions respectively, since when so located they are capable of considerably influencing the stability of the compounds.

Examples of diazos which we have found to be especially effective as the light sensitive agent in the formation of plates for photomechanical reproduction are:

(1) 2-butyl-3-diazo-3-pseudoindole
(2) 5-chloro-3-diazo-2-methyl-3-pseudoindole
(3) 1-diazo-2-phenyl-1-benz(e)indole
(4) 3-diazo-5,7-dibromo-2-methyl-3-pseudoindole
(5) 3-diazo-5,7-diphenyl-2-methyl-3-pseudoindole
(6) 3-diazo-2-ethyl-3-pseudoindole
(7) 3-diazo-2(3-indolyl)-3-pseudoindole
(8) 3-diazo-2-methyl-3-pseudoindole
(9) 3-diazo-2-methyl-5-phenyl-3-pseudoindole
(10) 3-diazo-2(2-naphthyl)-3-pseudoindole
(11) 3-diazo-5-nitro-2-phenyl-pseudoindole
(12) 3-diazo-2-phenyl-3-pseudoindole
(13) 3-diazoindiazole
(14) 1-diazo-1-benz(e)indiazole
(15) 3-diazo-5,7-dibromoindiazole
(16) 3-diazo-5-phenylindiazole
(17) 3-diazo-2,4-diphenyl-3H-pyrrolenine
(18) 2-p-chlorophenyl-3-diazo-4,5-diphenyl-3H-pyrrolenine
(19) 2,5-bis(p-chlorophenyl)-3-diazo-3H-pyrrolenine
(20) 2-(4-biphenylyl)-3-diazo-4,5-diphenyl-3H-pyrrolenine
(21) N-methyl-4'-(3-diazo-4,5-diphenyl-3H-pyrrolenin-2-yl)-benzenesulfonanilide
(22) 3-diazo-2,4,5-triphenyl-3H-pyrrolenine
(23) 4-diazo-2,5-diphenyl-4H-isoimidazole Many of the compounds and the parent materials for their production contemplated herein are known. In any case, the compounds and their parent materials may be readily prepared by conventional methods. For example, the pseudoindoles may be produced by nitrosating the corresponding indole, reducing the product to the amino indole, diazotizing the amine in acetic acid and neutralizing with a mild alkali, such as ammonium hydroxide.

The diazoindiazoles, on the other hand, may be produced by methods described by Bamberger, Berichte 32, 1780 (1899).

Specifically, compound 1 is derived from 2-tertiarybutylindole described in vol. 20, page 328 of Beilstein.

Compound 2 is derived from 2-methyl-5-chloroindole described in vol. 20, page 314 of Beilstein.

Compound 3 is derived from 2-phenyl-1-benz(e)indole described in Ann. 253, 42 (1889).

Compound 4 is derived from 5,7-dibromo-2-methylindole prepared in the same manner as its analog 5,7-dichloro-2-methylindole described in Berichte 51, 416 (1918). Such preparation involves the conversion of 2,4-dibromophenylhydrazine (Ann. 272, 219 (1893)), into acetone hydrazone which is cyclized to the indole in the usual fashion.

Compound 5 is prepared from 5,7-diphenyl-2-methylindole which, in turn, is prepared from m-terphenyl-4'-amine (J. Chem. Soc. 1939, page 1288 et seq.), by conventional procedures. Thus, the amine is converted to the hydrazine by diazotization and reduction. The hydrazine in turn is converted to the acetone hydrazone which is cyclized to the desired indole.

Compound 6 is produced from 2-ethylindole described in Beilstein 20, page 207 (second supplement).

Compound 9 is prepared from 2-methyl-5-phenylindole and said indole is prepared by converting p-xenylhydrazine (Berichte 27, 3106 (1894)) to acetophenone p-xenylhydrazone followed by cyclizing to the indole.

Compound 11 is derived from 5-nitro-2-phenylindole prepared from p-nitrophenylhydrazine (Berichte 29, 1834 (1896)), by the same procedure used in the preparation of the indole for compound 9.

Compound 16 is derived from 3-amino-5-phenylindiazole. The latter compound is produced by converting N-(3-bromo-4-biphenylyl)acetamide (J. Chem. Soc. 1926, 3051), to N-(3-cyano-4-biphenylyl)acetamide, according to the procedure of French Patent 828,202. The acetyl group is removed by alkaline hydrolysis and the resulting 4-amino-3-biphenylcarbonitrile is diazotized and reductively cyclized as in Example V.

The preparation of the remaining compounds appears in the various examples.

The diazo compounds utilized herein, while water insoluble are, nevertheless, soluble in a great range of organic solvents. In practice, it is preferable to employ as solvents those of relatively high boiling point in order to minimize the tendency of the diazo to crystallize during coating. Solvents which we have used are dioxane, methyl Cellosolve, dimethyl formamide, dimethyl acetamide and the like.

The surface to which the diazo is applied may be of metal, such as aluminum, zinc or the like, or of a plastic or resin, such as regenerated cellulose, surface-saponified cellulose acetate, polyvinyl acetate and mixtures thereof with other resins, PVM/MA admixed with cellulose acetate or the like. In other words, we may employ any of the surfaces generally used for the manufacture of printing plates. We may also employ in the coating of the diazos a small amount of a resinous material, such as, for example, copolymers of styrene and maleic anhydride and similar resins.

The processing of the plate follows along lines customary in the lithographic art embodying the employment of light sensitive diazo compounds. Thus, the coated plate is exposed under an original to effect photodecomposition in the light-struck portion of the plate. The decomposition products formed on exposure have a different solubility behavior toward certain reagents than the diazo per se, and an image may be developed by treatment with such reagents. This image, which is highly ink- and grease-receptive, is used in offset printing.

The following examples will serve to illustrate our invention, but it is to be understood that the invention is not restricted thereto. Parts given are by weight unless otherwise stated.

Example I

One gram of 3-diazo-2-methyl-3-pseudoindole of the structure

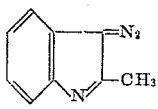

was dissolved in 100 mls. of dimethyl formamide, and the solution applied to a grained aluminum plate by means of a whirler. After thorough drying, the plate was exposed beneath a negative original to the radiation of a mercury arc. The exposed plate was washed with 1% phosphoric acid solution and, after a brief water rinse, could be used for offset printing. Positive copies were obtained.

The above compound was prepared by modification of the method of Castellana and D'Angelo, Gazz. chim. ital., 36, II, 56–62 (1906). 2-methylindole was nitrosated with n-butyl nitrite and sodium ethylate in alcoholic solution in similar fashion to the procedure of Spica and Angelico, Gazz. chim. ital., 29, II, 54 (1899), the product was reduced with sodium dithionite to 3-amino-2-methylindole, and this was diazotized in cold acetic acid solution with aqueous sodium nitrite. The product was isolated by adding ice water, filtering the insoluble by-product, and precipitating the diazo in the cold with a slight excess of ammonia. Purification was effected by crystallization from hexane.

Example II

A surface-oxidized aluminum plate was coated with a solution containing 1.5 parts of 3-diazo-2-phenyl-3-pseudoindole of the structure

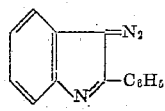

in 100 parts by volume of methyl Cellosolve and then dried. After exposure beneath a negative original, the exposed plate was treated with 1% phosphoric acid, and was ready for printing.

This diazo was obtained by a modification of the method of Castellana and D'Angelo, Gazz. chim. ital., 36 II, 56–62 (1906), and Angelico and Capuano, Gazz. chim. ital., 67, 633–7 (1937). 2-phenylindole was nitrosated in acetic acid solution with sodium nitrite, the product was reduced with dithionite, and the amine was diazotized in acetic acid. The product was obtained by neutralizing the reaction mixture with ammonia, final purification being effected by crystallization from heptane.

Example III

The procedure was the same as in Example II, excepting that 3-diazo-2-(2-naphthyl)-3-pseudoindole was employed. This product was prepared in the same way as the corresponding 2-phenyl derivative, excepting that 2-(naphthyl)indole was employed as the starting material. The starting material was made according to the procedures of Brunck Ann. 272, 205 (1893), and Claus, Tersteegen J. Pr. Chem. (2), 42, 518 (1890).

Example IV

An aluminum plate was coated as in Examples I and II with a 1% solution in dimethyl formamide of 3-diazo-2(3-indolyl)-3-pseudoindole of the structure

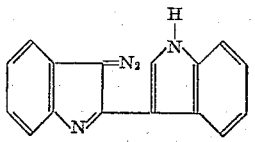

When the plate was processed as in Example I, it was capable of producing positive copies from a negative original.

Seidel's procedure, Berichte, 77B, 797–805 (1944), was followed to obtain this compound. Indole was treated with very dilute nitrous acid to give 2-(3-indolyl)-3-isonitroso-3-pseudoindole, which was reduced with dithionite to the corresponding amine. This was dissolved in acetic acid and treated with aqueous sodium nitrite. After being diluted with cold water and filtered, the solution was made slightly alkaline with ammonia and the precipitated diazo was collected and purified by washing with alcohol.

Example V

In 100 mls. of dioxane was dissolved 1 gram of 3-diazoindiazole of the formula

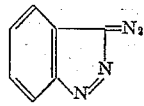

and the solution was coated by whirling on a surface-oxidized aluminum plate. After thorough drying, the plate was exposed beneath an original, swabbed for a short time with 1% phosphoric acid solution, and rinsed with water. The plate could without further treatment be used for printing on the offset press. Excellent positive copies were obtained from negative originals.

To prepare the above compound o-aminobenzonitrile was diazotized and reductively cyclized with stannous chloride to 3-aminoindiazole. This was diazotized in hydrochloric acid solution and the desired diazo was precipitated by neutralizing the mineral acid with sodium acetate. This is essentially the procedure described by Bamberger, Berichte, 32, 1780 (1899), but the isolation of the 3-aminoindiazole was improved by making a concentrated aqueous slurry of the tin double salt with sodium carbonate and extracting the amine with isopropyl alcohol.

Example VI

One gram of the diazo compound of Example V was dissolved in 100 mls. of dimethyl formamide, with the addition of 1 gram of a copolymer of styrene and maleic anhydride sold under the trade name "Lustrex X–820" by the Monsanto Chemical Company, Springfield, Massachusetts. A surface-oxidized aluminum foil was coated as in Example I, exposed beneath an original, and the plate treated with 5% trisodium phosphate solution. The diazo layer in the unexposed regions was hereby removed, leaving an image of improved adhesion and superior printing properties. Positive images were obtained from negative originals.

Example VII

One gram of the diazo compound of Example IV was dissolved in 100 mls. of dimethyl formamide and coated on the surface of a surface-saponified cellulose acetate foil and dried. After exposure beneath a negative original, the plate was swabbed with 1% phosphoric acid, rinsed with water, and put on an offset press. Excellent positive copies were obtained.

Example VIII

One gram of 1 diazo-1-benz(e)indiazole of the structure

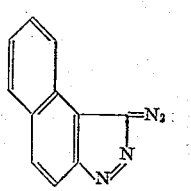

was dissolved in 100 mls. of dimethyl formamide and the solution was applied to a grained aluminum plate by means of a whirler. After thorough drying the plate was exposed beneath a negative to the radiation of a mercury arc. The exposed plate was washed with 1% hydrochloric acid solution and, after a brief water rinse, could be used for offset printing. Positive copies were obtained.

The 1-diazo-1-benz(e)indiazole was prepared as follows: N-(1-cyano-2-naphthyl)acetamide, made according to Example 19 of French Patent 828,202, was de-acetylated with sodium hydroxide in aqueous isopropyl alcohol to 2-amino-1-naphthonitrile. This product was diazotized and reductively cyclized with stannous chloride to 1-amino-1-benz(e)indiazole, M. 126–8°, which was converted to the desired compound by the method used in Example V for 3-diazoindiazole. Said compound melted at 140–3° with decomposition.

Example IX

Two grams of 3-diazo-5,7-dibromoindiazole of the structure

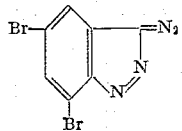

were dissolved in 100 mls. of dimethyl formamide, and the solution was applied to a grained aluminum plate by means of a whirler. After thorough drying, the plate was exposed beneath a negative original to the radiation of a mercury arc. The exposed plate was washed in a solution containing 50% water, 40% methanol, and 10% hydrochloric acid and, after a brief water rinse, could be used for offset printing. Positive copies were obtained.

To prepare the above sensitizer, 2-amino-3,5-dibromobenzonitrile (Bogert and Hand, J.A.C.S. 25, 937 (1903)) was diazotized and reductively cyclized to 3-amino-5,7-dibromoindiazole essentially as described in Example V for 3-aminoindiazole. The final product, purified by precipitation from acetic acid solution with water, melted in the range of 148–54° with decomposition.

Example X

A paper of high wet strength bearing on one side a calendered coating of casein and clay was coated with a lacquer of the following composition and dried.

6.25 grams PVM/MA, sp. viscosity 1.8–2.5
18.75 grams TH-5 cellulose acetate (Hercules Powder Company)
1200 mls. acetone
700 mls. methylene chloride
100 mls. methyl Cellosolve Such printing surfaces are more fully described in U.S. Patents 2,756,163 and 2,772,972.

This surface was bead coated with a 1% solution of the diazo of Example X in methyl isobutyl ketone. After thorough drying, the plate was exposed beneath a negative to the radiation of a mercury arc. The plate was swabbed with a solution consisting of:

| | Mls. |
|---|---|
| Monoethanolamine | 3 |
| Triethanolamine | 20 |
| Ethylene glycol | 60 |
| Glycerol | 120 |

This removed the diazo compound from the non-irridated areas but left the diazo photodecomposition products intact. A subsequent swabbing of the developed plate with a commercial fixing solution sold by Addressograph Multigraph Corporation readied the plate for offset printing. Positive copies were obtained.

Example XI

A grained aluminum foil was coated with a solution containing one gram of 3-diazo-6-phenylindiazole having the structure

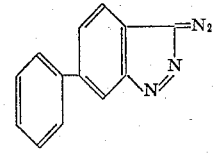

in 100 mls. of methyl Cellosolve and dried. This dried foil was exposed to ultraviolet light beneath a negative original. The exposed plate was treated with a solution of the following composition:

| | Mls. |
|---|---|
| Monoethanolamine | 1.5 |
| Triethanolamine | 10.0 |
| Glycerol | 25.0 |
| Ethylene glycol | 63.5 |

The unexposed diazo compound was thus removed, leaving a visible positive image on a clean background. After a rinse and treatment with a 5% aqueous solution of phosphoric acid, the plate could be inked to give a positive printing image.

3-diazo-6-phenylindiazole was made as follows: 3-amino-4-biphenylcarbonitrile (Jones, J. Org. Chem. 10, 537 (1945)), was diazotized and reductively cyclized with stannous chloride to 3-amino-6-phenylindiazole, M. 228–30°. This intermediate was then diazotized in dilute aqueous hydrochloric acid. The resultant yellow slurry was treated with sodium acetate solution and the product was isolated by filtration. It was purified by dissolving in dilute hydrochloric acid and precipitating with sodium acetate solution in the form of fine yellow crystals which were sensitive to light and melted with decomposition at 235° after partial decomposition at about 130°.

Example XII

A paper of high wet strength was lacquered as in Example X. This was sensitized with a solution consisting of: 0.63 gram of 3-diazo-2,4-diphenyl-3H-pyrrolenine of the probable formula:

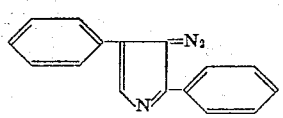

0.5 gram of vinyl acetate, sole by Bakelite Corporation as "Ayac," 0.95 gram of a copolymer of vinyl acetate and crotonic acid sold by Monsanto Chemical Company as "Polymer C-3" and 100 grams of methyl isobutyl ketone.

After being dried, the plate was exposed beneath a negative original to the radiation of a mercury arc. Imagewise development was accomplished with a solution consisting of:

| | Mls. |
|---|---|
| Monoethanolamine | 1.5 |
| Triethanolamine | 10.0 |
| Glycerol | 25.0 |
| Ethylene glycol | 63.5 |

The plate was then fixed with a commercial fixing solution and run on an offset duplicator. Positive copies were obtained. Similar results could be obtained by imagewise development with a solution comprising:

| | Mls. |
|---|---|
| Diethanolamine | 15 |
| Ethylene glycol | 85 |

The compound 3-diazo-2,4-diphenyl-3H-pyrrolenine was prepared by diazotizing 3-amino-2,4-diphenylpyrrole (Gabriel, Berichte 41, 1132–40 (1908)), in acetic acid solution with aqueous sodium nitrite. Addition of water precipitated yellow crystals which were sensitive to light and melted with decomposition at 170° C.

*Example XIII*

Presensitized plates were made according to the procedure employed in Example XII except that an equal amount of 2-p-chlorophenyl-3-diazo-4,5-diphenyl-3H-pyrrolenine of the following structure was used instead of 3-diazo-2,4-diphenyl-3H-pyrrolenine:

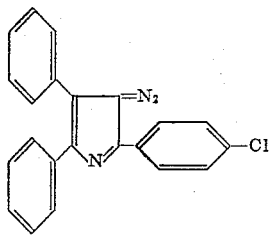

Imagewise development after exposure under a negative could be accomplished with either of the developing solutions employed in Example XII. Positive copies were obtained when these plates were run on an offset duplicator.

The 2-p-chlorophenyl-3-diazo-4,5-diphenyl - 3H - pyrrolenine was made in the following way: 4'-chloroacetophenone and benzoin were condensed by refluxing in aqueous ethanol with added potassium cyanide. The 4-p-chlorophenyl-1,2-diphenyl-1,4-butanedione formed, after recrystallization from isopropyl alcohol, melted at 111–2°. This was cyclized to 5-p-chlorophenyl-2,3-diphenylpyrrole, M. 124–5°, by refluxing with ammonium acetate in acetic acid. The pyrrole was converted by the action of alcoholic butyl nitrite and alkali to 2-p-chlorophenyl-4,5-diphenyl-3-nitrosopyrrole, M. 228–9°. This was reduced over palladium on carbon in acetic acid to 3-amino-2-p-chlorophenyl - 4,5 - diphenylpyrrole, which without isolation was diazotized with aqueous nitrite to the desired compound. It was isolated by pouring the acetic acid solution into water, adding sodium acetate, filtering, washing, and drying, and melted at 119-21° with decomposition.

*Example XIV*

Presensitized plates were made according to the procedure employed in Example XII except that an equal amount of 2,5-bis(p-chlorophenyl)-3-diazo-3H-pyrrolenine of the following structure was used instead of 3-diazo-2,4-diphenyl-3H-pyrrolenine:

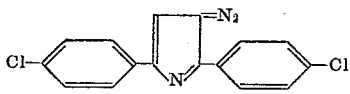

Imagewise development after exposure under a negative could be accomplished with either of the developing solutions employed in Example XII. Positive copies were obtained when these plates were run on an offset duplicating machine.

In order to make 2,5-bis(p-chlorophenyl)-3-diazo-3H-pyrrolenine, M. 124–6°, 1,4-bis(p-chlorophenyl)-2-butene-1,4-dione (Conant and Lutz, J.A.C.S. 45, 1305 (1923)), was reduced in boiling methanol with dithionite to 1,4-bis(p-chlorophenyl)-1,4-butanedione, M. 151–2°. The subsequent operations were similar to those described in Example XIII, i.e., cyclization to the pyrrole, M. 181.5–3°, nitrosation to the nitrosopyrrole, M. 223–4°, reduction and diazotization.

*Example XV*

A paper of high wet strength was lacquered as in Example X. This was sensitized with a solution consisting of 1 gram of 2-(4-biphenylyl)-3-diazo-4,5-diphenyl-3H-pyrrolenine of the structure:

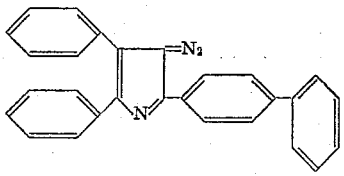

1 gram of the copolymer of vinyl acetate with a low molecular carboxylic acid, sold by National Starch Products, Inc., as "Resyn RX820C" and 100 mls. of methyl isobutyl ketone.

This coating was dried. The plate was exposed beneath a negative original to the radiation of a mercury arc. Imagewise development was accomplished with a solution consisting of:

| | Mls. |
|---|---|
| Monoethanolamine | 1.5 |
| Triethanolamine | 10.0 |
| Glycerol | 25.0 |
| Ethylene glycol | 63.5 |

After being swabbed with a commercial fixing solution, the plate was run on an offset duplicator. Positive copies were obtained.

Similar results could be obtained by substituting an equal amount of N-methyl-4'-(3-diazo-4,5-diphenyl-3H-pyrrolenin-2-yl)benzenesulfonanilide of the structure:

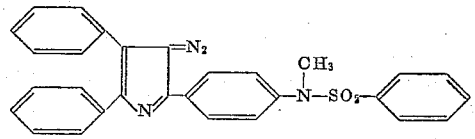

for 2-(4-biphenylyl)-3-diazo-4,5-diphenyl-3H-pyrrolenine.

Preparation of 2-(4-biphenylyl)-3-diazo-4,5-diphenyl-3H-pyrrolenine was accomplished as follows: 4'-phenylacetophenone (J.A.C.S. 63, 1939–40 (1941)), was condensed with benzoin in aqueous ethanol in the presence of potassium cyanide to 2-desyl-4'-phenylacetophenone, a resinous solid which resisted crystallization. This was cyclized by refluxing with about 5 parts of acetic acid containing 1.6 parts of ammonium acetate. The resulting 5-(4-biphenylyl)-2,3-diphenylpyrrole was isolated by adding water, extracting the solid with hot ethanol, and recrystallizing from benzene. It melted at 208–10° and gave the following analysis:

| Element | Calculated | Found |
|---|---|---|
| Carbon | 90.56 | 90.07 |
| Hydrogen | 5.66 | 5.96 |
| Nitrogen | 3.77 | 4.08 |

This pyrrole was then nitrosated, reduced and diazotized by the procedure of Example XIII. The light sensitive product melted in the range of 125–30° with decomposition.

The starting point in the synthesis of N-methyl-4'-(3-diazo - 4,5 - diphenyl-3H-pyrrolenin-2-yl)benzenesulfonanilide is the condensation in aqueous sodium hydroxide of benzenesulfonyl chloride and 4'-aminoacetophenone to give 4'-acetylbenzenesulfonanilide. Recrystallized from ethanol, this product melted at 132–4°. It was methylated in aqueous sodium hydroxide solution to N-methyl-4'-acetylbenzenesulfonanilide, which, after recrystallization from ethanol, melted at 110–1°. Refluxed in aqueous ethanol with benzoin and potassium cyanide, the methylated product reacted to give N-methyl-4'-desylacetylbenzenesulfonanilide, M. 134–5° from ethanol. Cyclization to the pyrrole with ammonium acetate and acetic acid was carried out as described above. Nitrosation was accomplished in glacial acetic acid with solid sodium nitrite. The nitrosated compound was reduced with zinc dust in acetic acid to the amino derivative, which, without isolation, was diazotized in acetic acid with aqueous sodium nitrite. The photosensitive product, melting in the range of 100-10° with decomposition, was precipitated by the addition of aqueous sodium acetate solution.

*Example XVI*

A paper of high wet strength was lacquered as in Example X. This was sensitized with a solution consisting of 1 gram of 3-diazo-2,4,5-triphenyl-3H-pyrrolenine of the structure:

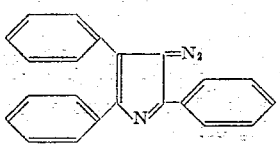

0.5 gram of vinyl acetate "Ayac," 1 gram of the copolymer of styrene with the half butyl ester of maleic acid (acid 180°) sold by Monsanto Chemical Company as "SC-4 Resin" and 100 mls. of methyl isobutyl ketone.

This coating was dried. The plate was exposed beneath a negative original to the radiation of a mercury arc. Imagewise development was accomplished with the same developing solution employed in Example XV. After being swabbed with a commercial fixing solution, the plate was run on an offset duplicator. Positive copies were obtained.

Similar results could be obtained by substituting an equal amount of either "Polymer C-3" or the copolymer of vinyl acetate with 1 gram of "Resyn RX820C" for "SC-4 Resin" in this example.

The 3-diazo-2,4,5-triphenyl-3H-pyrrolenine was prepared essentially as described by Angelico (Atti. accad. Lincei (5) 14, 11, 169 (1905)), Angeli and Marchetti ib. (5) 16, 11, 790 (1907), and Ajello (Gazz. chim. ital. 66, 616-23 (1936)).

*Example XVII*

A solution of one gram of the sensitizer of Example XVI of the structure

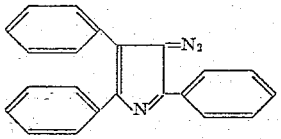

and one gram of the product sold by National Starch Products, Inc. as "Resyn RX820C" dissolved in 100 mls. of "methyl Cellosolve" was applied to a grained aluminum plate by means of a whirler. After thorough drying, the plate was exposed beneath a negative original to the radiation of a mercury arc. The plate was washed with a solution consisting of:

| | Mls. |
|---|---|
| Hexylene glycol | 20 |
| Ethylene glycol | 15 |
| Monoethanolamine | 3 |
| Water | 62 | and, after a brief water rinse, could be used for offset printing. Positive copies were obtained.

*Example XVIII*

A paper of high wet strength was lacquered as in Example X. This was sensitized with a solution of 1 gram of 4-diazo-2,5-diphenyl-4H-isoimidazole of the structure

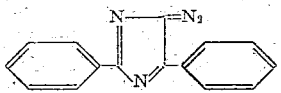

dissolved in 100 mls. of methyl isobutyl ketone. This coating was dried. The plate was exposed beneath a negative original to the radiation of a mercury arc. Imagewise development was accomplished with a solution consisting of:

| | Mls. |
|---|---|
| Monoethanolamine | 1.5 |
| Triethanolamine | 10.0 |
| Glycerol | 88.5 |

After being swabbed with a commercial fixing solution, the plate was run on an offset duplicator. Positive copies were obtained.

The above light sensitive compound was obtained by diazotizing 4-amino-2,4-diphenylimidazole hydrochloride (Cook, Davis, Heilbron, and Thomas, J. Chem. Soc. 1949, 1071-4), in acetic acid solution with aqueous sodium nitrite solution. The solution was buffered with sodium acetate and refrigerated. The yellow product was isolated in the usual way. It melted at 75-80° with decomposition.

This application is in part a continuation of our co-pending application, Serial No. 382,216, filed September 24, 1953, now abandoned.

Modifications of the invention will occur to persons skilled in the art and we, therefore, do not intend to be limited in the patent granted except as necessitated by the appended claims.

The temperature values given throughout the specification are in degrees of centigrade.

We claim:

1. A photosensitive coated product suitable for the photolithographic manufacture of greasy, ink-receptive planographic printing plates comprising a base used for the manufacture of printing plates and selected from the class consisting of aluminum, zinc, regenerated cellulose, surface-saponified cellulose acetate, polyvinyl acetate and copolymers of maleic anhydride with an aliphatic vinyl ether, said base having a top coating of a light sensitive layer which is adapted to be converted to imaged and non-imaged areas, said light sensitive layer including a heterocyclic diazo compound containing not more than three heteronitrogen atoms in the heterocyclic ring, said diazo compound being selected from the class consisting of 3-diazo-3H-pyrrolenines; 3-diazo-3H-isopyrazoles; 4-diazo-4H-isoimidazoles; 4-diazo-4H-isopyrazoles; 4-diazo-4H-1,2,3-triazoles; 3-diazo-pseudoindoles and 3-diazo-indiazoles, said pyrrolenines, isopyrazoles, isoimidazoles and 1,2,3-triazoles having at least two carbon atoms of the heterocyclic ring thereof substituted by a radical selected from the class consisting of a benzo radical, a naphtho radical and a phenyl radical.

2. The process of producing a greasy, ink-receptive planographic printing plate which comprises exposing to light under a pattern of photosensitive material comprising a base selected from the class consisting of aluminum, zinc, regenerated cellulose, surface-saponified cellulose acetate, polyvinyl acetate and copolymers of maleic anhydride with an aliphatic vinyl ether and including a top coating on said base of a light sensitive layer adapted to be converted to imaged and non-imaged areas, said light sensitive layer including a heterocyclic diazo compound containing not more than three hetero nitrogen atoms in the heterocyclic ring, said diazo compound being selected from the class consisting of 3-diazo-3H-pyrrolenines; 3-diazo-3H-isopyrazoles; 4-diazo-4H-isoimidazoles; 4-diazo-4H-isopyrazoles; 4-diazo-4H-1,2,3-triazoles; 3-diazo-pseudoindoles and 3-diazo-indiazoles, said pyrrolenines, isopyrazoles, isoimidazoles and 1,2,3-triazoles having at least two carbon atoms of the heterocyclic ring thereof substituted by a radical selected from the class consisting of a benzo radical, a naphtho radical and a phenyl radical, treating the photosensitive material with a solvent selected from the class consisting of a mineral acid, trisodium phosphate and mixtures of an alkylol amine with a glycol to develop an image by removal of the unexposed areas of the photosensitive material.

3. The product as defined in claim 1, wherein the light sensitive diazo compound is a diazopseudoindole.

4. The product as defined in claim 1, wherein the light sensitive diazo compound is a diazoindiazole.

5. The product as defined in claim 1, wherein the light sensitive diazo compound is a diazo-3H-pyrrolenine.

6. The product as defined in claim 1, wherein the light sensitive diazo compound is a diazo-4H-isoimidazole.

7. The product as defined in claim 1, wherein the base is aluminum.

8. The product as defined in claim 1, wherein the light sensitive diazo compound is 3-diazo-2-methyl-3-pseudoindole.

9. The product as defined in claim 1, wherein the light sensitive diazo compound is 3-diazoindiazole.

10. The product as defined in claim 1, wherein the light sensitive diazo compound is 3-diazo-2,4,5-triphenyl-3H-pyrrolenine.

11. The product as defined in claim 1, wherein the base is coated with a resinous copolymer containing the light sensitive diazo compond.

12. The process as defined in claim 2, wherein the light sensitive diazo compound is a diazopseudoindole.

13. The process as defined in claim 2, wherein the light sensitive diazo compound is a diazoindiazole.

14. The process as defined in claim 2, wherein the light sensitive diazo compound is a diazo-3H-pyrrolenine.

15. The process as defined in claim 2, wherein the light sensitive diazo compound is a diazo-4H-isoimidazole.

16. The process as defined in claim 2, wherein the light sensitive diazo compound is 3-diazo-2-methyl-3-pseudoindole.

17. The process as defined in claim 2, wherein the light sensitive diazo compound is 3-diazoindiazole.

18. The process as defined in claim 2, wherein the light sensitive diazo compound is 3-diazo-2,4,5-triphenyl-3H-pyrrolenine.

References Cited in the file of this patent

UNITED STATES PATENTS

| | | |
|---|---|---|
| 1,926,322 | Van der Grinten | Sept. 12, 1933 |
| 2,420,791 | Nies | May 20, 1947 |
| 2,441.800 | Degering et al. | May 18, 1948 |
| 2,754.209 | Schmidt et al. | July 10, 1956 |
| 2,759,817 | Schmidt et al. | Aug. 21, 1956 |

FOREIGN PATENTS

| | | |
|---|---|---|
| 67,633–7 | Italy | (1939) |

OTHER REFERENCES

Gilman: Organic Chem., vol. IV, pp. 785–787, copyright 1953, publ. by John Wiley, N.Y.

Saunders: Aromatic Diazo Compounds, copyright 1949, pp. 52–59.

The Ring Index, Patterson & Capell, 1940, Reinhold Publ., p. 123.

UNITED STATES PATENT OFFICE
CERTIFICATION OF CORRECTION

Patent No. 2,971,842                      February 14, 1961

Ralph G. D. Moore et al.

It is hereby certified that error appears in the above numbered patent requiring correction and that the said Letters Patent should read as corrected below.

Column 2, lines 8 to 11, the left-hand portion of formula (1) should appear as shown below instead of as in the patent:

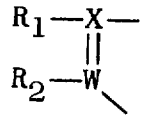

column 5, lines 59 and 60, for "2-(naphthyl)indole" read -- 2-(2-naphthyl)indole --; column 12, line 52, for "of" read -- a --.

Signed and sealed this 29th day of August 1961.

(SEAL)
Attest:

ERNEST W. SWIDER
Attesting Officer

DAVID L. LADD
Commissioner of Patents